United States Patent [19]

Saito et al.

[11] Patent Number: 4,975,720
[45] Date of Patent: Dec. 4, 1990

[54] EXPOSURE DEVICE AND IMAGES FORMING APPARATUS PROVIDED WITH THE EXPOSURE DEVICE

[75] Inventors: Masao Saito, Fujisawa; Tsutomu Masuda, Tokyo, both of Japan

[73] Assignee: Kabushiki Kaisha Toshiba, Kawasaki, Japan

[21] Appl. No.: 419,945

[22] Filed: Oct. 11, 1989

[30] Foreign Application Priority Data

Oct. 12, 1988 [JP] Japan ................... 63-256122

[51] Int. Cl.$^5$ ................. G01D 15/14; G03B 27/54
[52] U.S. Cl. ................................ 346/160; 355/67
[58] Field of Search ............... 346/160, 160.1; 355/67, 355/214

[56] References Cited

U.S. PATENT DOCUMENTS

| | | | |
|---|---|---|---|
| 3,580,671 | 5/1971 | Lavander | 355/675 X |
| 4,525,059 | 6/1985 | Haramaki | 355/67 X |
| 4,653,904 | 3/1987 | Imamura | 355/214 X |
| 4,733,280 | 3/1988 | Irie | 355/67 |

Primary Examiner—Donald A. Griffin
Attorney, Agent, or Firm—Foley & Lardner, Schwartz, Jeffery, Schwaab, Mack, Blumenthal & Evans

[57] ABSTRACT

An exposure device comprising a table having a plane on which an original is placed, a light emitting device for emitting a light on the original placed on the plane, a scanning device for scanning the original on the plane while the emitting device is being moved along the plane, and a light adjusting device for adjusting the quantity of light emitted from the emitting device. The light adjusting device includes a shutter adapted to narrow the path of light emitted from the emitting device and adjust the quantity of light, an urging member for urging the shutter in a predetermined direction, an operating member for operating the shutter against the urging force of the urging member, when the emitting device is being moved and the shutter abuts against the operating member, and a holding device for holding the shutter, which has been moved to a predetermined position by the operating member, until the shutter abuts against the operating member again.

12 Claims, 7 Drawing Sheets

EXPOSURE DEVICE AND IMAGES FORMING APPARATUS PROVIDED WITH THE EXPOSURE DEVICE

BACKGROUND OF THE INVENTION

1. Field of the Invention

The present invention relates to an exposure device which can be applied to the color images forming machine of the thermal type and, more particularly, it relates to an exposure device provided with a device capable of varying the quantity of light shot relative to the plane of the machine on which originals are placed.

2. Description of the Related Art

Color images forming machines of the thermal type are widely used these days they can be grouped into two kinds, one of which is the melting thermal type, providing high resolution, and the other is of the subliming thermal type, making it difficult for images to be erased and corrected. In addition, an image forming machine suitable for forming licenses, certificates and tickets for automatic systems is under development. This machine is intended to form an image on a recording medium according to both the melting and sublimimg thermal techniques so as to make use of the advantages attained by each.

In the case where images are formed according to the melting and subliming thermal techniques, using the image forming machine, however, printing speed according to the subliming thermal manner is slower, as compared with the melting thermal technique. When the quantity of light shot from an exposure light source is made suitable for the melting thermal technique, therefore, it becomes excessive for the subliming manner, making it impossible to form good images.

SUMMARY OF THE INVENTION

The object of the present invention is therefore to provide an exposure device having a light adjusting device capable of easily adjusting the quantity of light emitted relative to a plane of an image forming machine on which an original is placed.

This object of the present invention can be achieved by an exposure device comprising a table having a plane on which an original is placed, a light emitting device for emitting a light on the original placed on the plane, a scanning device for scanning the original on the plane while the emitting device is being moved along the plane, and a light adjusting device for adjusting the quantity of light emitted from the emitting device. The light adjusting device includes a shutter adopted to narrow the path of light emitted from the emitting device and adjust the quantity of light, an urging member for urging the shutter in a predetermined direction, an operating member for operating the shutter against the urging force of the urging member, when the emitting device is being moved and the shutter abuts against the operating member, and a holding device for holding the shutter, which has been moved to a predetermined position by the operating member, until the shutter abuts against the operating member again.

According to the exposure device of the present invention, the shutter or light screening member is not contacted with the operating member and held at its retreated position when it is not needed that the quantity of light shot is reduced. When the quantity of light is to be reduced, the light emitting device or carriage is overrun, for example, to strike the screening member against the operating member or the operating member is projected into the carriage-moving path to abut against the light screening member and move it from its retreated position to its light screening position against the urging member. It is held this time at its light screening position by a holding unit. As a result, a part of the quantity of light shot relative to the originals-placed plane of the machine is screened to thereby reduce the quantity of light. When the operating member abuts the light screening member again, the light screening member is unlocked and returned to its retreated position by the urging member.

DETAILED DESCRIPTION OF THE PREFERRED EMBODIMENTS

An embodiment of the present invention will be described referring to FIGS. 1 through 5C.

Figure 2:
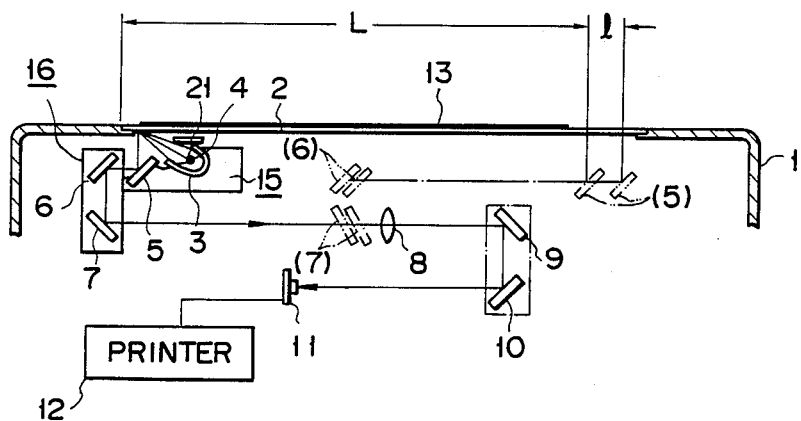
FIG. 2 is a side view schematically showing an optical system of the image forming machine into which the exposure device is incorporated.

FIG. 2 schematically shows an arrangement of the image forming machine into which an exposure device of the present invention is incorporated. This image forming machine has machine body 1, originals-placed plane or table 2 is arranged on the top of body 1, and exposure lamp 4, enclosed by reflector 3 and serving as an exposure light source, shoots light to the original 13 placed on the originals-placed plane or table 2. The light reflected is introduced to lens 8 through first, second and third mirrors 5, 6 and 7 and then to photoelectric converter element (CCD) 11 through fourth and fifth mirrors 9 and 10.

Exposure lamp 4 enclosed by reflector 3 and first mirror 5 are mounted on first carriage 15 which reciprocates along the underside of originals-placed plane or table 2. Second and third mirrors 6 and 7 are mounted on second carriage 16 which moves at a speed half as much as that of first carriage 15 but in the same direction in which first carriage 15 moves. When exposure lamp 4 and first mirror 5 and second and third mirrors 6 and 7 on carriages 15 and 16 are moved rightward from their positions shown by solid lines in FIG. 2, original 13 placed on originals-placed table 2 of the machine is scanned and slit-exposed into photoelectric converter element 11. Printer 12 of the melting and/or subliming thermal types is connected to this photoelectric converter element 11. Printing can be freely selected from either of the melting and subliming thermal manners to meet the purpose intended.

An embodiment of the exposure device according to the present invention will be described.

Figure 1:
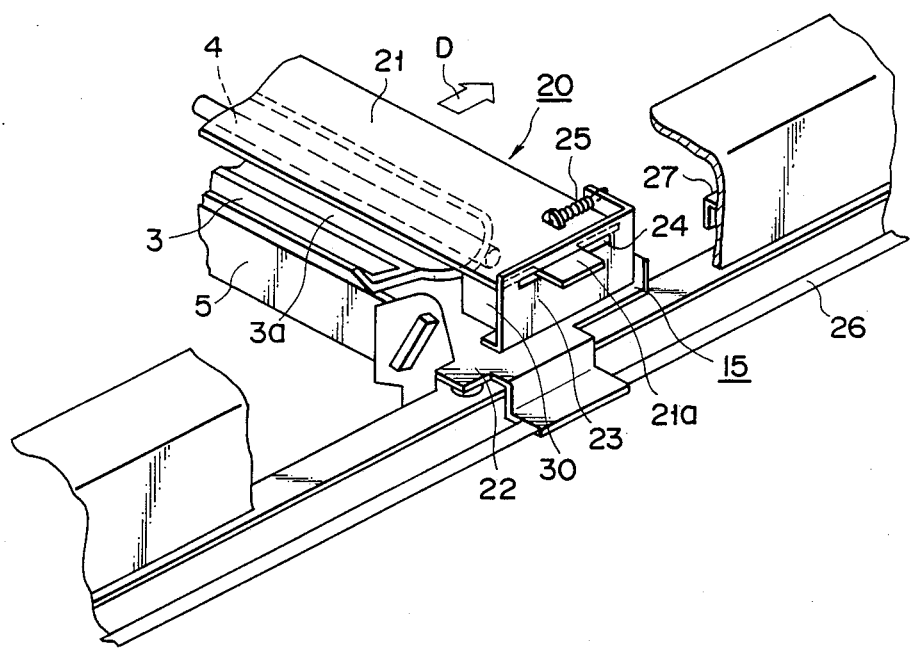
FIG. 1 is a perspective view showing the main portion of an exposure device of the present invention partly sectioned.
Figure 3:
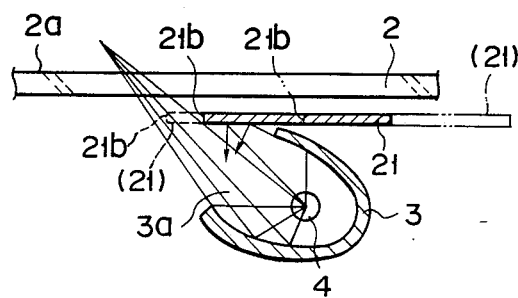
FIG. 3 is a sectional view showing the exposure device from which light is shot to the originals-placed plane of the machine.

As shown in FIGS. 1 and 3, light adjusting unit 20 for varying the quantity of light shot relative to originals-placed table 2 is mounted on first carriage 15. Unit 20 has exposure lamp 4 and shutter 21 which serves as a light screening member. When images of the melting thermal type are to be formed, this shutter 21 is held at its retreated position (shown by two-dot and dash line in FIG. 3) where no light is screened by shutter 21, but when images of the subliming thermal type is intended, shutter 21 is located at its light-screening position (shown by a solid line in FIG. 3).

Only one end of shutter 21 is shown in FIG. 1, but shutter 21 has projections 21a at both ends thereof and these projections 21a of shutter 21 are inserted into guide slits 24 of support plates 23 attached to the top of both ends of carriage frame 22. Therefore, shutter 21 can move forward and backward and when it is slid forward (or in a direction reverse to arrow D), it is positioned above light-shooting opening 3a of reflector 3, covering a part of light-shooting opening 3a. Pulling springs 25 are arranged between both ends of shutter 21 and support plates 23 to pull shutter 21 backward (or in a direction shown by arrow D). In other words, shutter 21 is usually urged to return to its retreated position shown by two-dot and dash line in FIG. 3.

First carriage 15 is connected to carriage driving belt 26 which is moved forward and backward by a motor (not shown), and it is reciprocated only by scanning distance L together with carriage driving belt 26. When the printer connected to CCD 11 is switched to form images from under the melting thermal mode to under the subliming thermal mode and vice versa, the motor is run for a predetermined longer time to let first carriage 15 overrun usual scanning distance L by distance l, as shown in FIG. 2.

Figure 4:
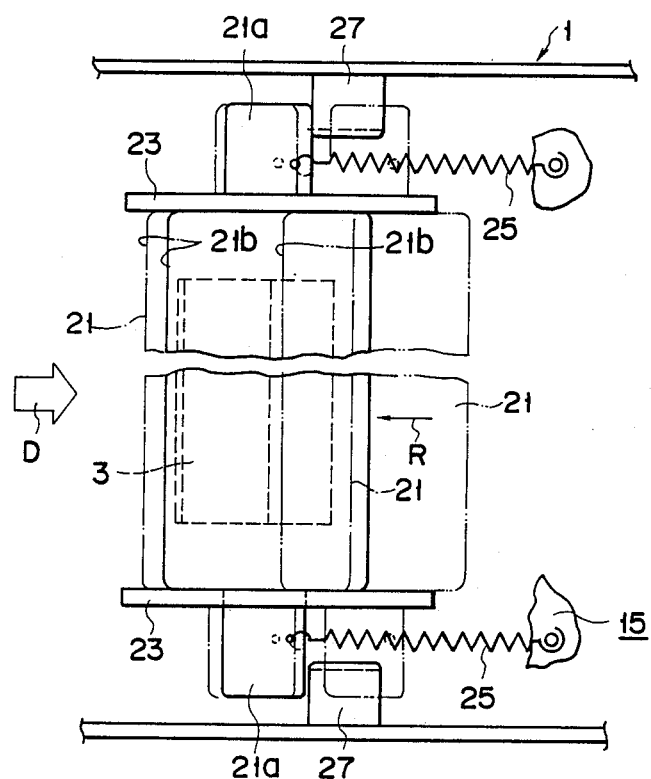
FIG. 4 is a plan view schematically showing the exposure device.

As shown in FIG. 4, a pair of stoppers 27 attached to body 1 of the images forming machine and arranged in the overrunning path of first carriage 15 serve as operating members to abut against projections 21a of both ends of shutter 21. When first carriage 15 is moved in its scanning direction (shown by arrow D) to overrun its predetermined stop position as shown in FIG. 4, therefore, projections 21a of shutter 21 abut against stoppers 27, causing shutter 21 to be slid in the reverse direction (shown by arrow R) against the tension of pulling springs 25.

Shutter locking unit 30 is attached to each of support plates 23 which support both ends of shutter 21 so as to be freely slidable. These units 30 serve to lock and unlock shutter 21 which has been slid to its light screening position (shown by solid lines in FIGS. 3 and 4) as the result of its projections 21a being abutted against stoppers 27.

Figure 5A:
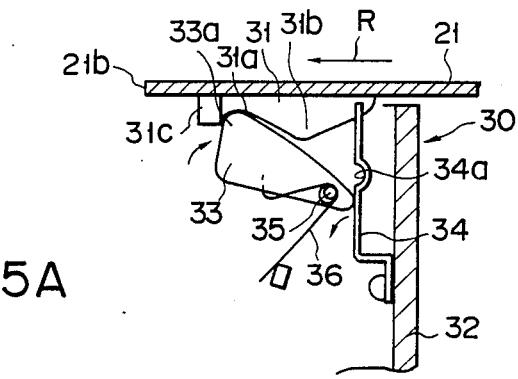
FIGS. 5A through 5C are side views, each shows a shutter locking unit provided to the exposure device according to the present invention.
Figure 5B:
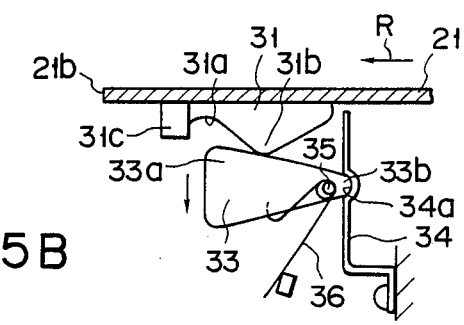
Figure 5C:
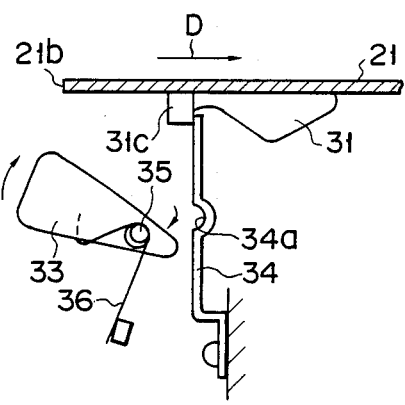

Shutter locking unit 30 has such an arrangement as shown in FIGS. 5A through 5C. Cam stopper 31 is attached to the underside of shutter 21 and casing 32 attached to each support plate 23 includes latch 33, leaf spring 34 and the like. Latch 33 is rotatable around rod 35 and usually urged to rotate clockwise by torsion spring 36. When shutter 21 reaches its light screening position shown by solid lines in FIGS. 3 and 4, front portion 33a of latch 33 is engaged with groove 31a of cam stopper 31 to hold shutter 21 there against pulling springs 25. When first carriage 15 is once overrun, shutter 21 can be moved from its retreated position where the quantity of light shot is suitable for forming images of the melting thermal type to its light screening position where the quantity of light shot is suitable for forming images of the subliming thermal type.

Shutter 21 is returned from its light screening position to its retreated position when first carriage 15 is overrun again. In detail, when shutter 21 is further pushed by stopper 27 in direction R to reach its position shown by a dotted line in FIG. 3, latch 33 is pushed down against torsion spring 36 by means of cam portion 31b of cam stopper 31 to thereby release its front portion 33a from groove 31a of cam stopper 31, as shown in FIG. 5B. Back portion 33b of latch 33 is engaged this time with recess 34a of leaf spring 34 and held therein. As the result, shutter 21 is moved in a direction reverse to arrow R and returned to its retreated position by means of pulling springs 25. Before shutter 21 is returned to its retreated position, the front end of leaf spring 34 is pushed and elastically deformed by projection 31c of cam stopper 31 so that back end 33b of latch 33 can be released from recess 34a of leaf spring 34.

A variation of the operating member will be described referring to FIG. 6.

Figure 6:
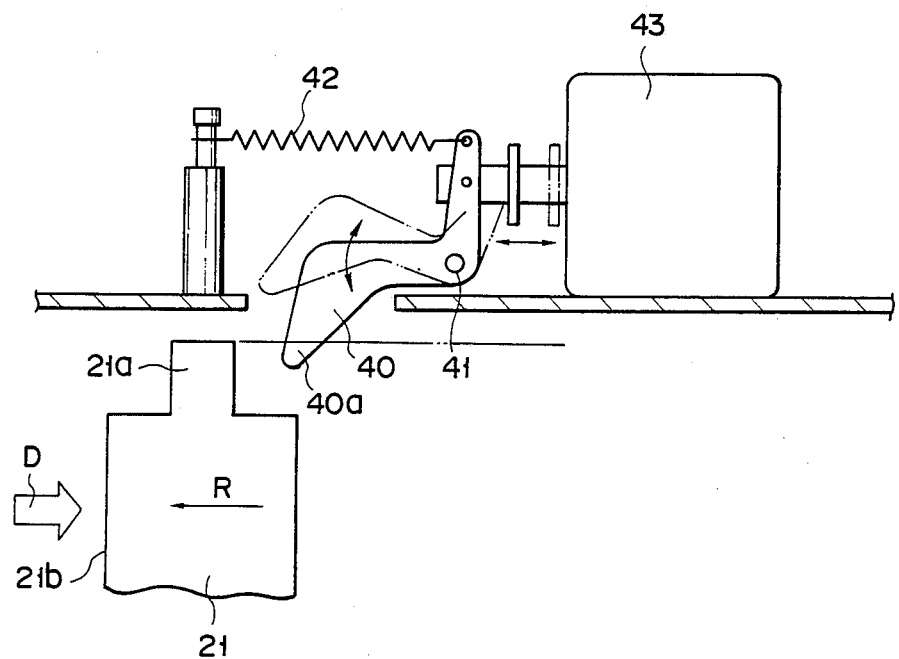
FIG. 6 is a plan view showing a modification of the operating member which moves the light screening member.

Locking and unlocking of shutter locking unit 30 have been achieved by overrunning first carriage 15 in the case of the above-described embodiment according to the present invention, but movable stopper 40 which serves as the operating member is projected into and retreated from the carriage moving path, as shown in FIG. 6. in the case of this modification of the operating member. This movable stopper unit includes movable stopper 40 rotatable around axial rod 41, pulling spring 42 for urging movable stopper 40 anticlockwise direction, and solenoid 43 for rotating movable stopper 40 clockwise direction against pulling spring 42. When this solenoid 43 is turned off, front end 40a of movable stopper 40 is projected into the carriage moving path, while when solenoid 43 is turned on, it is retreated from the carriage moving path. When the movable stopper unit is located at the side of the scanning path of the carriage, therefore, shutter 21 can be abutted against stopper 40 in scanning distance L without overrunning first carriage 15. This enables the body of the images forming machine to be compacted.

A modification of the shutter locking unit will be described with reference to FIGS. 7 and 8A through 8D.

Figure 7:
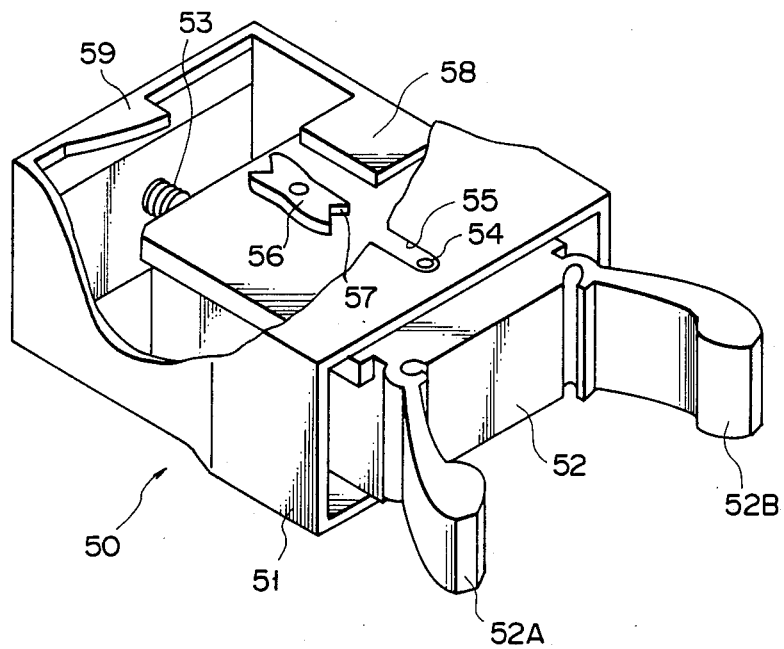
FIG. 7 is a perspective view showing a modification of the shutter locking unit partly sectioned.

FIG. 7 shows a modification of the shutter locking unit which is a typical push-catch mechanism. This push-catch mechanism 50 includes case 51 having an opening at one side thereof, slider 52 freely slidable into case 51, and compression spring 53 arranged between the bottom wall of case 51 and slider 52. Projection 54 is located on the top surface of the front portion of slider 54 and inserted into slit 55, which is provided in the upper wall of case 51 and extends in the sliding direction of slider 52. Therefore, slider 52 is urged forward by compression spring 53 but limited in its sliding range in case 51 by projection 54.

A pair of claws 52A and 52B for grasping or holding shutter 21, which has been moved to its light screening position, are formed at the front side of slider 52. The base portion of each of these claws 52A and 52B is curved and made flexible. When slider 52 is pushed into case 51, therefore, these paired claws 52A and 52B are elastically deformed at their base portions by both side walls of case 51 which define the opening of case 51. As the result, two claws 52A and 52B approaches to each other to grasp or hold the grip of shutter 21 (or projection 31c shown in FIG. 5A). Further, rotary plate 56 which is shaped like a reversed S and has V-shaped grooves at both ends thereof is attached to the top surface and at the back portion of slider 52. This rotary plate 56 can rotate around an axial rod on the top of slider 52.

Figure 8A:
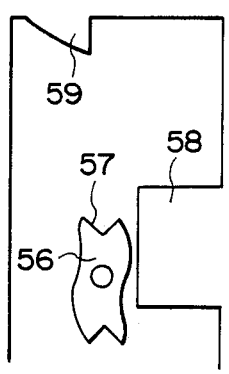
FIGS. 8A through 8D are schematic plan views showing the action of the shutter locking unit.
Figure 8B:
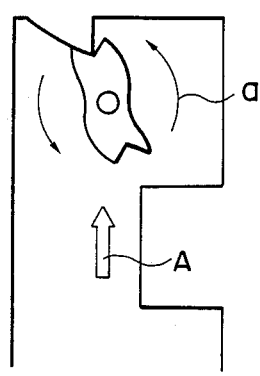

First rectangular protrusion 58 is projected inward from the upper portion of one side wall of case 51 and second triangular protrusion 59 is projected inward from the upper portion of the bottom wall of case 51. These first and second protrusions 58 and 59 are positioned as shown in FIG. 8A. Rotary plate 56 attached to slider 52 is usually positioned, as shown in FIG. 8A, relative to first and second protrusions 58 and 59.

Referring to FIGS. 8A through 8D, it will be described how push-catch mechanism 50 acts.

Figure 8C:
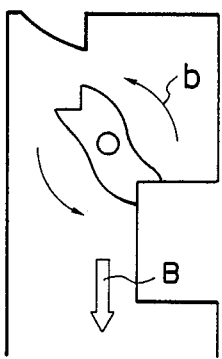
Figure 8D:
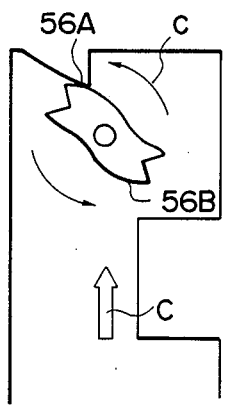

When push-catch mechanism 50 is under such state as shown in FIGS. 7 and 8A, the grip of shutter 21 is released from between claws 52A and 52B. When slider 52 is pushed from this state in a direction shown by arrow A in FIG. 8B and against compression spring 53, one V-shaped groove 57 of rotary plate 56 is engaged with the top of second protrusion 59, causing rotary plate 56 to be a little rotated in a direction shown by arrows (a). When slider 52 is advanced forward in a direction shown by arrow B by compression spring 53, as shown in FIG. 8C, the other V-shaped groove 57 of rotary plate 56 is engaged with a back corner of first protrusion 58. As the result, slider 52 is kept in such a state that it grasps the grip of shutter 21 between its claws 52A and 52B. When slider 52 is pushed backward again, as shown in FIG. 8D, front side 56a of rotary plate 56 is abutted against the top side of second protrusion 58, causing rotary plate 56 to be further rotated in a direction shown by arrows (c). When slider 52 is advanced forward from this state, the other side 56B of rotary plate 56 is abutted against the back side of first protrusion 58, causing rotary plate 56 to be further rotated to such state as shown in FIG. 8A. Claws 52A and 52B are thus caused to release the grip of shutter 21.

When the above-described process is repeated, push-catch mechanism 50 holds shutter 21 responsive to the first push of slider 52 and releases it responsive to the second push of slider 52.

It should be understood that the present invention is not limited to the above-described embodiments but that various changes and modifications can be made without departing from the spirit and scope of the present invention.

What is claimed is:

1. An exposure device comprising:
   a table having a plane on which an original is placed;
   means for emitting a light onto the original placed on the plane;
   means for scanning the original on the plane while the emitting means is being moved along the plane; and
   means for adjusting the quantity of light emitted from the emitting means, the adjusting means including:
   shutter means for narrowing the path of the light emitted from the emitting means and thereby adjusting the quantity of light;
   means for urging the shutter means in a predetermined direction;
   means for operating the shutter means against the urging force of the urging means, when the emitting means is being moved and the shutter means abuts against the operation means, the operating means having a stopper with a solenoid, which is moveable into and out of a moving path of the emitting means; and
   means for holding the shutter means, which has been moved to a predetermined position by the operating means, until the shutter means abuts the operating means again.

2. The exposure device according to claim 1, wherein said light emitting, means includes a carriage of an image forming apparatus.

3. The exposure device according to claim 1, wherein said operating means has a stopper located in the moving path of the light emitting means for stopping the movement of the light emitting means.

4. The exposure device according to claim 1, wherein said operating means has a stopper with a solenoid, which is movable into and out of a moving path of the light emitting means.

5. The exposure device according to claim 1, wherein said holding means has a push-catch means.

6. An image forming apparatus comprising:
   a table having a plane on which an original is placed;
   means for emitting a light onto the original placed on the plane;
   means for scanning the original on the plane while the emitting means is moved along the plane;
   means for forming the image responsive to light reflected from the original;
   means for adjusting the quantity of light emitted from the emitting means, the adjusting means including:
   shutter means for narrowing the path of the light emitted from the emitting means and adjusting the quantity of light;
   means for urging the shutter means in a predetermined direction;
   means for operating the shutter means against the urging force of the urging means, when the emitting means is being moved and the shutter means abuts against the operating means, the operating means having a stopper with a solenoid, which is movable into and out of a moving path of the emitting means; and
   means for holding the shutter means, which has been moved to a predetermined position by the operating means, until the shutter means abuts against the operating means against.

7. The images forming apparatus according to claim 6, wherein said operating means has a stopper located in a moving path of the carriage.

8. The images forming apparatus according to claim 6, wherein said operating means has a stopper with a solenoid, which is movable into and out of a moving path of the carriage.

9. The images forming apparatus according to claim 6, wherein said holding means has a push-catch means.

10. The images forming apparatus according to claim 6, wherein said printing means has a printing device of the melting thermal type.

11. The images forming apparatus according to claim 6, wherein said printing means has a printing device of the subliming thermal type.

12. In a light exposure device, comprising:
   a table having a plane on which an original is placed;
   a light emitting device for emitting a light onto the original place on the plane;

a scanning device for scanning the original on the plane while the emitting device moves along the plane;

a light adjusting device for adjusting the quantity of light emitted form the emitting device;

the light adjusting device comprising a shutter adapted to adjust the amount of light emitted onto the original;

an urging member for urging the shutter in a predetermined direction;

an operating member for operating the shutter against the urging force of the urging member when the emitting device is moving; and a holding device for holding the shutter which has been moved to a predetermined position by the operating member.

* * * * *